(12) United States Patent
Chishima et al.

(10) Patent No.: US 8,866,908 B2
(45) Date of Patent: Oct. 21, 2014

(54) MOBILE CAMERA SYSTEM

(75) Inventors: Makoto Chishima, Kanagawa (JP); Kugo Morita, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1831 days.

(21) Appl. No.: 11/318,654

(22) Filed: Dec. 27, 2005

(65) Prior Publication Data

US 2006/0152592 A1 Jul. 13, 2006

(30) Foreign Application Priority Data

Dec. 27, 2004 (JP) .............................. P.2004-377864

(51) Int. Cl.
| | |
|---|---|
| *H04N 9/47* | (2006.01) |
| *H04B 7/26* | (2006.01) |
| *H04N 1/32* | (2006.01) |
| *H04N 21/23* | (2011.01) |
| *H04N 1/21* | (2006.01) |
| *H04N 7/18* | (2006.01) |
| *H04N 1/00* | (2006.01) |
| *H04N 21/21* | (2011.01) |
| *G01S 5/00* | (2006.01) |
| *G08G 1/123* | (2006.01) |

(52) U.S. Cl.
CPC ...... *H04N 1/2179* (2013.01); *H04N 2201/0096* (2013.01); *H04B 7/26* (2013.01); *H04N 1/32128* (2013.01); *H04N 21/23* (2013.01); *H04N 2201/0055* (2013.01); *H04N 2201/3253* (2013.01); *H04N 7/185* (2013.01); *H04N 1/00204* (2013.01); *G01S 5/0027* (2013.01); *H04N 1/2187* (2013.01); *G08G 1/123* (2013.01); *H04N 21/21* (2013.01); *H04N 2201/3215* (2013.01); *H04N 2201/0039* (2013.01); *H04N 2201/0084* (2013.01)

USPC .......................................... 348/149; 348/143

(58) Field of Classification Search
CPC ... H04B 7/26; H04N 1/00204; H04N 1/2179; H04N 1/2187; H04N 1/232128; H04N 7/185; G01S 5/0027
USPC ................................................. 348/143–159
See application file for complete search history.

(56) References Cited

U.S. PATENT DOCUMENTS

| | | | | |
|---|---|---|---|---|
| 6,233,523 | B1 * | 5/2001 | Sood .............................. | 701/409 |
| 6,615,134 | B2 | 9/2003 | Ando | |

(Continued)

FOREIGN PATENT DOCUMENTS

| | | |
|---|---|---|
| CN | 1482567 A | 3/2004 |
| DE | 44 28 306 | 4/1996 |

(Continued)

OTHER PUBLICATIONS

Chinese language office action and its English language translation lists the references above.

(Continued)

*Primary Examiner* — Timothy J Henn
*Assistant Examiner* — Pritham Prabhakher
(74) *Attorney, Agent, or Firm* — DLA Piper LLP (US)

(57) ABSTRACT

A mobile camera system is provided in which a user can view images of various desired locations while staying in a location remote from those locations. A control server acquires positions of a plurality of mobile camera apparatuses set up on mobile bodies such as vehicles, and images that are acquired by the mobile camera apparatuses, via radio communication. Then, the control server manages the positions and the images in its image DB. Then, in response to an imaging request that is issued from a terminal apparatus to designate a location (area), the control server searches for the image satisfying the request, in the image DB, or newly acquires the image satisfying the request, from the mobile camera apparatus. Then, the control server transmits the image to the terminal apparatus via radio communication.

12 Claims, 11 Drawing Sheets

(56) References Cited

U.S. PATENT DOCUMENTS

| | | | |
|---|---|---|---|
| 7,035,440 B2 * | 4/2006 | Kaku | 382/115 |
| 7,050,102 B1 * | 5/2006 | Vincent | 348/333.02 |
| 7,100,190 B2 * | 8/2006 | Johnson et al. | 725/105 |
| 7,222,356 B1 * | 5/2007 | Yonezawa et al. | 725/105 |
| 7,325,061 B2 * | 1/2008 | Haruki | 709/226 |
| 2002/0001468 A1 * | 1/2002 | Kaku | 396/310 |
| 2002/0135680 A1 * | 9/2002 | Haruki | 348/207.2 |
| 2002/0173907 A1 | 11/2002 | Ando | |
| 2002/0184383 A1 * | 12/2002 | Song | 709/236 |
| 2003/0033150 A1 | 2/2003 | Balan et al. | |
| 2003/0067623 A1 | 4/2003 | Akiyama | |
| 2004/0005879 A1 | 1/2004 | Yashio et al. | |
| 2004/0054609 A1 | 3/2004 | Takahashi | |
| 2004/0139470 A1 | 7/2004 | Treharne | |
| 2004/0165063 A1 * | 8/2004 | Iida et al. | 348/143 |
| 2004/0189816 A1 * | 9/2004 | Nakazawa et al. | 348/211.2 |
| 2007/0019077 A1 * | 1/2007 | Park | 348/211.99 |

FOREIGN PATENT DOCUMENTS

| | | |
|---|---|---|
| JP | 08-129216 | 5/1996 |
| JP | 10-307993 | 11/1998 |
| JP | 2001-157196 | 6/2001 |
| JP | 2001-256477 | 9/2001 |
| JP | 2001-339708 | 12/2001 |
| JP | 2001339334 A | 12/2001 |
| JP | 2001346191 A | 12/2001 |
| JP | 2002-209206 | 7/2002 |
| JP | 2002218436 A | 8/2002 |
| JP | 2002374514 A | 12/2002 |
| JP | 2003125382 A | 4/2003 |
| JP | 2003/153230 | 5/2003 |
| JP | 2003198905 A | 7/2003 |
| JP | 2003317193 A | 11/2003 |
| WO | 02077868 A1 | 10/2002 |
| WO | 03/058969 | 7/2003 |
| WO | 03058969 A1 | 7/2003 |
| WO | WO03/058969 A1 * | 7/2003 |

OTHER PUBLICATIONS

Japanese language office action dated Sep. 14, 2010 and its English language translation for corresponding Japanese application 2004377864 lists the references above.

* cited by examiner

FIG. 3

| ID1 | IMAGE DATA 1 | POSITION INFORMATION | TIME INFORMATION |
|---|---|---|---|
| ID2 | IMAGE DATA 2 | POSITION INFORMATION | TIME INFORMATION |
| ⋮ | ⋮ | ⋮ | ⋮ |
| IDn | IMAGE DATA n | POSITION INFORMATION | TIME INFORMATION |

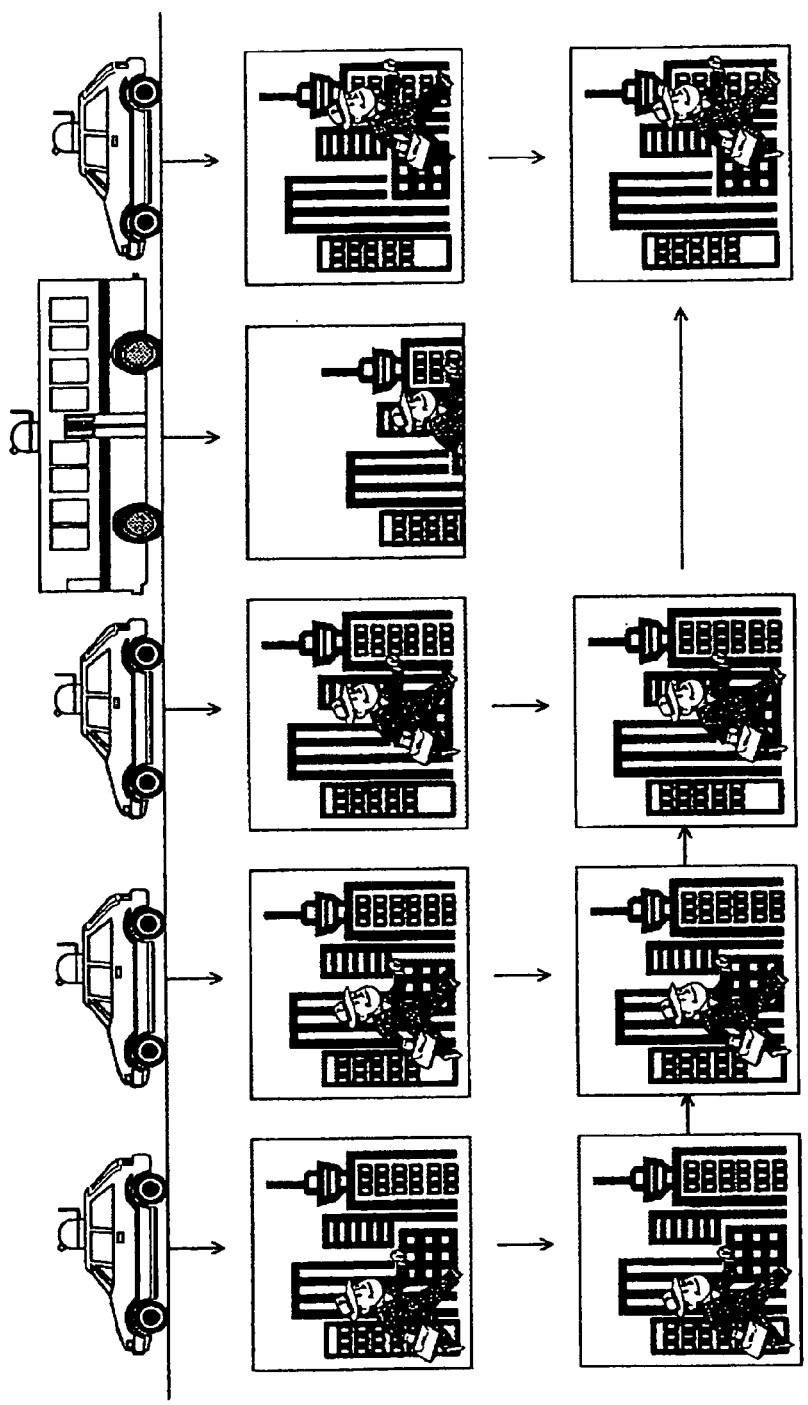

MOBILE CAMERA SYSTEM

This application claims foreign priority based on Japanese Patent application No. 2004-377864, filed Dec. 27, 2004, the contents of which is incorporated herein by reference in its entirety.

BACKGROUND OF THE INVENTION

1. Field of the Invention

The present invention relates to a mobile camera system for remotely acquiring an image taken by a mobile camera that is fixed to a mobile body such as a vehicle to move together with the mobile body.

2. Description of the Related Art

In recent years, multifunctional radio communication terminals typified by a cellular phone are developing. Among them, there is a radio communication terminal in which a GPS (Global Positioning System) receiver having an antenna that receives a radio wave from a GPS satellite to get location information is installed. The location information obtained by the GPS receiver is utilized in various applications, and technological developments are improved to enhance user's convenience.

For example, in JP-A-8-129216, a camera is disclosed that is configured with the GPS receiver so as to record the location information obtained by the GPS receiver along with an image when taking the image.

Also, in JP-A-10-307993, a system is disclosed in which the GPS receiver is installed in a vehicle, and information including ID of a mobile station on the vehicle, vehicle information, the location information obtained by the GPS receiver, time, vehicle speed, and the like are transmitted to a base station from the mobile station over the radio. In the system, then the base station transmits the information from the base station to a fixed station via a telephone line, and the fixed station calculates information on road traffic such as traffic jams based on the received information.

Meanwhile, it is very convenient for a user, if the user can view images of various desired locations while staying in a location remote from those locations, by utilizing the location information.

However, it is not practical to set up fixed cameras capable of radio communication in various locations and then acquire images from these fixed cameras, in respects of a method of supplying power to the fixed cameras, installation cost, networking maintenance to connect to the Internet, and the like.

SUMMARY OF THE INVENTION

An object of the present invention is to provide a mobile camera system with which a user can view images of various desired locations while staying in a location remote from those locations.

A first aspect of the invention is a mobile camera system which comprises: at least one mobile camera which is assigned with identification information; a terminal apparatus; and a server, wherein the mobile camera includes: a first communication section for communicating with the server; an imaging section for imaging a subject; and a transmitting section which transmits image data of an image that is imaged in the imaging section and the identification information to the server, wherein the terminal apparatus includes: a second communication section for communicating with the server; and a requesting section which transmits an imaging request signal to the server, the imaging request signal designating a location and requesting imaging of the designated location, wherein the server includes: a third communication section for communicating with the mobile camera and the terminal apparatus, the third communication section receiving the image data from the mobile camera; a location search section which has location information of the mobile camera and the identification information that are correlated with each other, and searches for and specifies the mobile camera that is in the location designated by the imaging request signal based on the location information; and an imaging instructing section which transmits an imaging instruction signal to the specified mobile camera, the imaging instruction signal instructing the mobile camera to perform imaging, and wherein the specified mobile camera performs the imaging in response to the imaging instruction signal.

Here, the location designated by the terminal apparatus includes a predetermined range.

Preferably, in the mobile camera system of the first aspect of the invention, the at least one mobile camera includes a plurality of the mobile cameras, the terminal apparatus further includes a selecting section which selects the mobile camera to which the imaging instructing section of the server transmits the imaging instruction signal, from the mobile cameras specified by the location search section, and the imaging instructing section transmits the imaging instruction signal to the mobile camera selected by the selecting section.

Preferably, in the mobile camera system of the first aspect of the invention, the transmitting section of the mobile camera transmits information about a scheduled running route and a speed of the mobile camera to the server, and the location search section of the server searches for and specifies the mobile camera that is scheduled to move to the location designated by the imaging request signal within a predetermined period, based on the received information about the scheduled running route and the speed.

Preferably, in the mobile camera system of the first aspect of the invention, the imaging request signal further designates a time, and the location search section of the server searches for and specifies the mobile camera that is in the designated location at the designated time, based on the location information of the mobile camera.

Preferably, in the mobile camera system of the first aspect of the invention, the server further includes a storage which stores the image data received from the mobile camera, and the second communication section of the terminal apparatus acquires the image data stored in the storage.

Preferably, in the mobile camera system of the first aspect of the invention, the imaging instructing section of the server continuously transmits the imaging instruction signal to the mobile camera that is specified by the location search section, while the specified mobile camera is in the location designated by the imaging request signal.

Preferably, in the mobile camera system of the first aspect of the invention, the location search section of the server sequentially searches for and specifies the mobile camera that is in the location designated by the imaging request signal.

Preferably, in the mobile camera system of the first aspect of the invention, the at least one mobile camera includes a plurality of the mobile cameras, the server further includes a selecting section which selects the mobile camera of which camera setting condition is the same as that stored in the server, from the mobile cameras specified by the location search section, the imaging instructing section transmits the imaging instruction signal to the selected mobile camera continuously, and the camera setting condition includes at least one of a setting height, an elevation angle and a zoom, of the mobile camera.

A second aspect of the invention is a mobile camera system which comprises: at least one mobile camera; a terminal apparatus; and a server, wherein the mobile camera includes: a first communication section for communicating with the server; an imaging section for imaging a subject; and a first transmitting section which transmits image data of an image that is imaged in the imaging section to the server, wherein the terminal apparatus includes: a second communication section for communicating with the server; and a requesting section which transmits a search request signal to the server, the search request signal designating information that includes at least one of an imaging location and an imaging time, and the search request signal requesting a search of the image data that is correlated with the designated information, and wherein the server includes: a third communication section for communicating with the mobile camera and the terminal apparatus, the third communication section receiving the image data from the mobile camera; a storage for storing the received image data and information that includes at least one of an imaging location and an imaging time of the image data, the image data and the information being correlated with each other; an image search section which searches for and specifies the image data that is correlated with the information designated by the search request signal, from the image data stored in the storage, in response to the search request signal received from the terminal apparatus; and wherein a second transmitting section which transmits the specified image data to the terminal apparatus.

Preferably, in the mobile camera system of the second aspect of the invention, the mobile camera acquires the information that includes at least one of the imaging location and the imaging time, and the first transmitting section of the mobile camera transmits the acquired information and the image data to the server, that are correlated with each other.

Preferably, in the mobile camera system of the second aspect of the invention, the server further includes a selecting section which selects the image data of the image that is imaged by the mobile camera of which camera setting condition is the same as that stored in the server, from the image data specified by the image search section, the second transmitting section of the server transmits the selected image data to the terminal apparatus continuously, and the camera setting condition includes at least one of a setting height, an elevation angle and a zoom, of the mobile camera.

BRIEF DESCRIPTION OF THE DRAWINGS

FIG. 3 is a table showing a data format of image data IMG.

FIG. 10A to 10C are schematic views showing an image selecting process.

DESCRIPTION OF THE PRFERRED EMBODIMENTS

<First Embodiment>

A first embodiment of the present invention will be explained with reference to the accompanying drawings hereinafter.

Figure 1:
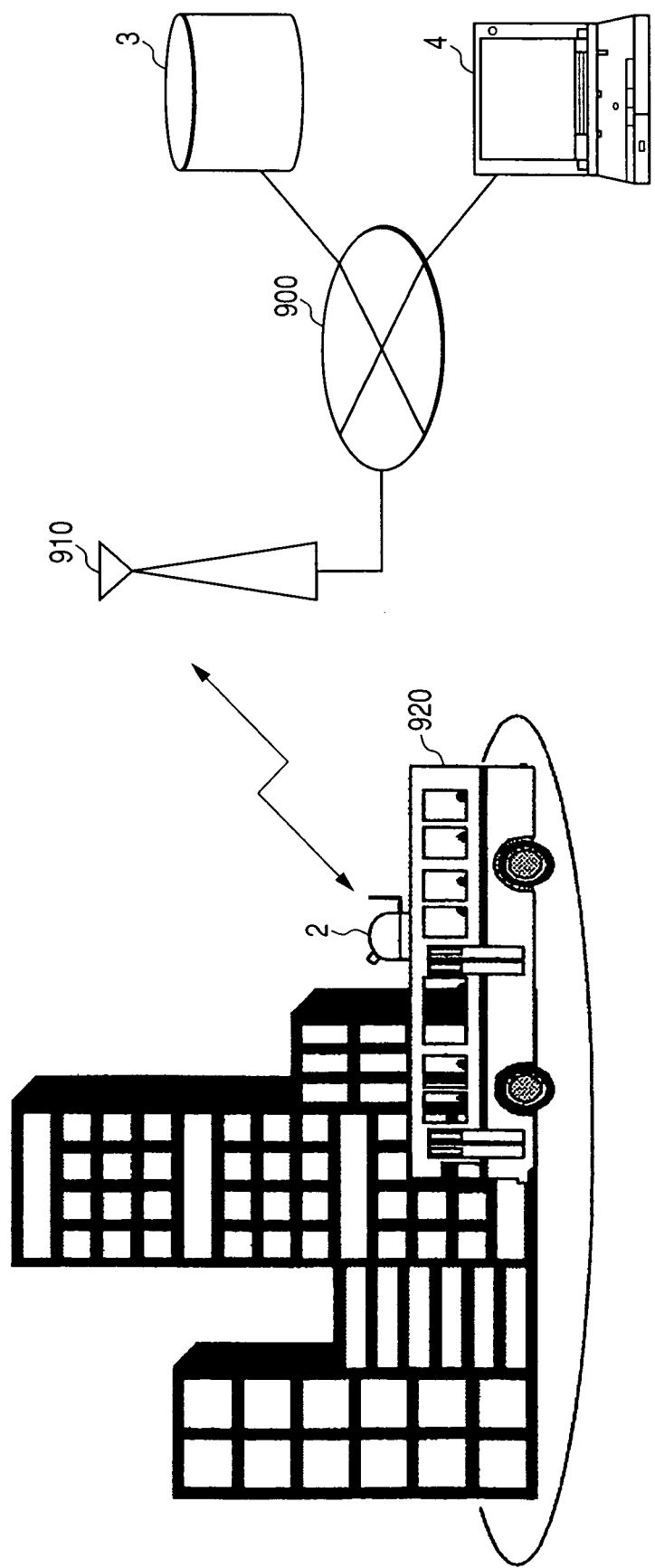
FIG. 1 is a system configuration diagram of a mobile camera system according to an embodiment of the present invention.

FIG. 1 is a system configuration diagram showing a mobile camera system 1 according to an embodiment of the present invention.

As shown in FIG. 1, the mobile camera system 1 includes a mobile camera apparatus (mobile camera) 2 set up on a vehicle 920, a control server (server) 3 and a terminal apparatus (terminal) 4 as major components. The mobile camera system 1 provides such a system that makes it possible for a user operating the terminal apparatus 4 to acquire images of desired locations or the like through the mobile camera apparatus 2 located remotely, and then view the images on a display screen of the terminal apparatus 4.

Positions of the mobile camera apparatus 2, the control server 3 and the terminal apparatus 4 can be anywhere as long as they are connectable to a network 900. In FIG. 1, the control server 3 and the terminal apparatus 4 are connectable to the network 900, and the mobile camera apparatus 2 is connectable to the network 900 via a base station 910.

Next, configurations of the mobile camera apparatus 2, the control server 3 and the terminal apparatus 4, which configures the mobile camera system 1, will be explained with reference to FIG. 2 hereunder.

In the mobile camera system 1, the mobile camera apparatus 2 is installed in a plurality of vehicles respectively. Each of the mobile camera apparatuses is assigned with an ID (identification information) for identifying itself among a plurality of mobile camera apparatuses.

The mobile camera apparatus 2 is installed on a roof of the vehicle such as a car or a bus, for example, to acquire an image of outside of the vehicle (building, landscape, etc.) as a subject, in response to an instruction issued from the control server 3.

The mobile camera apparatus 2 has a GPS function, and periodically transmits GPS data (GPS) to the control server 3. In the GPS data, its own position information acquired by the GPS function and time information acquired by a time information acquiring section 26 are correlated with each other.

Figure 2:
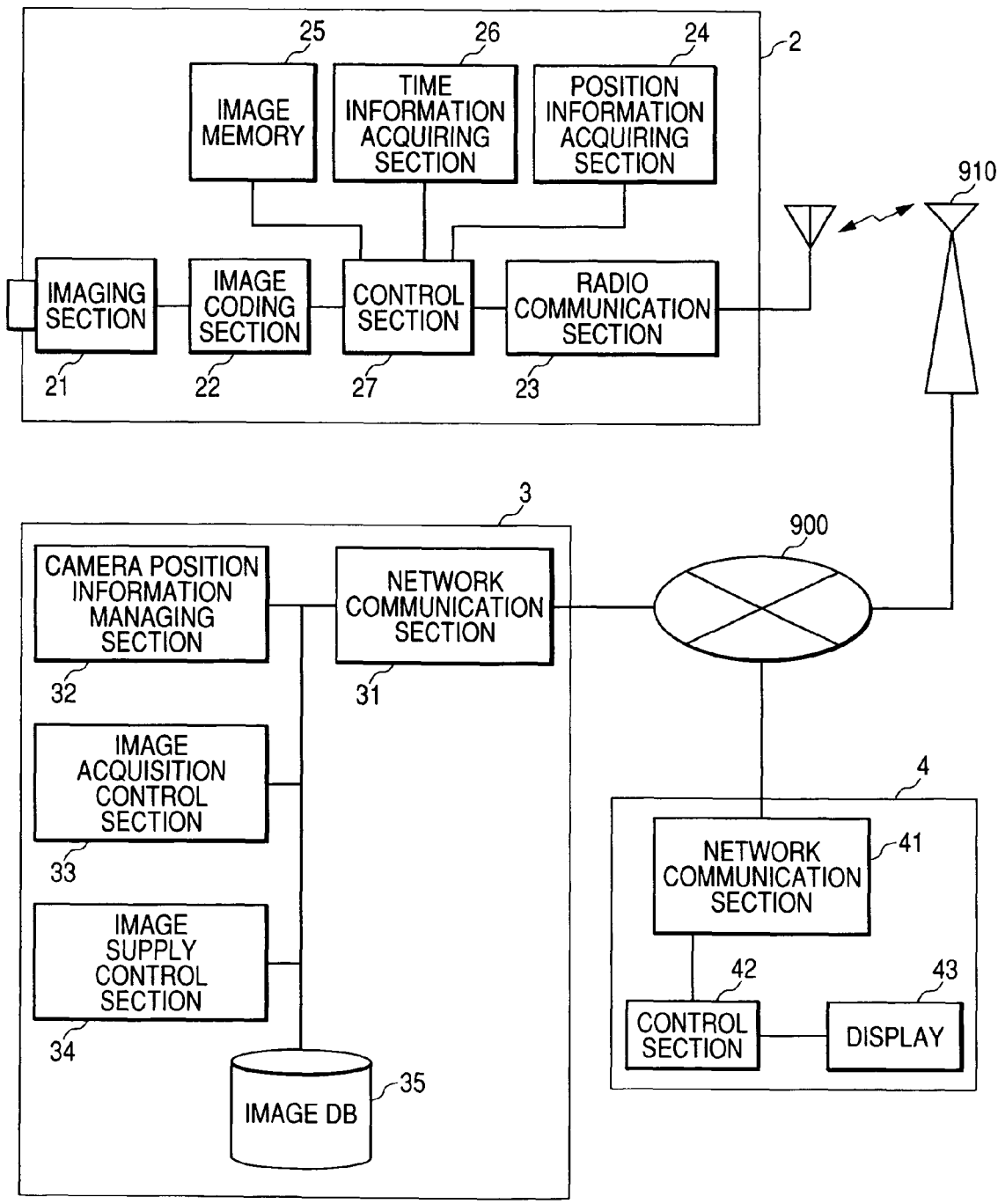
FIG. 2 is a block diagram showing configurations of a mobile camera apparatus, a control server, and a terminal apparatus respectively.

As shown in FIG. 2, the mobile camera apparatus 2 includes an imaging section 21, an image coding section 22, a radio communication section 23, a position information acquiring section 24, an image memory 25, the time information acquiring section 26, and a control section 27.

The imaging section 21 is configured to include a condensing lens for forming an image of the subject, a CCD (Charge Coupled Device) for converting the formed image into an electric signal, and further a signal processing circuit for performing a signal processing on the electric signal to generate image digital data, and the like.

The image coding section 22 encodes the image digital data generated by the imaging section 21. The image coding section 22 encodes still image data based on JPEG or GIF, and encodes moving image data based on MPEG, for example.

The radio communication section 23 has a transmitting/receiving antenna, and performs radio communication with the control server 3 via the base station 910 and the network 900. For example, a radio communication circuit adapted to a cdma2000 1x system or a cdma2000 1x EV-DO system is installed.

The radio communication section 23 receives an imaging instruction signal ICI which instructs an imaging, from the control server 3, and transmits image data IMG, described later, to the control server 3.

The position information acquiring section 24 has the GPS function. More particularly, the position information acquiring section 24 has a GPS antenna, and acquires propagation time of the radio wave and orbit information of a satellite from the radio waves received from a plurality of GPS satellites (e.g., three or the like). Then, the position information acquiring section 24 obtains a distance from the GPS satellite and a position of the GPS satellite based on these information to acquire its own position information.

The image memory 25 stores the image acquired by the imaging section 21 therein as image data IMG.

FIG. 3 is a table showing an example of a data format of the image data IMG.

As shown in FIG. 3, the image data IMG is a data including the image digital data coded by the image coding section 22, the ID of the camera, the position information obtained by the position information acquiring section 24, and time information obtained by the time information acquiring section 26, which are correlated mutually.

The time information acquiring section 26 has a timer, and acquires present time information. In this case, the time information acquiring section 26 may be built in the control section 27.

The control section 27 is configured mainly with a microcomputer, and performs an overall control of the mobile camera apparatus 2. For example, the control section 27 executes transmission/reception control of various information over the radio in the radio communication section 23, various timing controls, access control to the image memory 25, and the like.

Also, when the imaging section 21 acquires an image, the control section 27 executes a process of generating the image data IMG by correlating the position information obtained by the position information acquiring section 24 and the time information obtained by the time information acquiring section 26 along with the acquired image, for example.

In addition, the control section 27 controls the imaging section 21 to acquire the image based on the imaging instruction signal ICI received from the control server 3.

The control server 3 is a control server for controlling the mobile camera apparatus 2.

The control server 3 manages the position of the mobile camera apparatus 2 being correlated with the ID, and receives an imaging request from the terminal apparatus 4 to issue the imaging instruction to the mobile camera apparatus 2. Also, the control server 3 issues the imaging instruction to the mobile camera apparatus 2 voluntarily. Then, the control server 3 stores the image data acquired in response to the imaging instruction in an image database.

Further, the control server 3 searches the image data that satisfy a search request given from the terminal apparatus 4, in response to the search request, and then supplies the specified image data to the terminal apparatus 4.

As shown in FIG. 2, the control server 3 includes a network communication section 31, a camera position information managing section 32, an image acquisition control section 33, an image supply control section 34, and an image database 35.

The network communication section 31 performs radio communication with the mobile camera apparatus 2 via the network 900 and the base station 910. Also, the network communication section 31 performs radio communication with the terminal apparatus 4 via the network 900. For example, the radio communication circuit adapted to the cdma2000 1x system or the cdma2000 1x EV-DO system is installed into the network communication section 31.

The network communication section 31 receives the GPS data (GPS) including the position information and the time information from the mobile camera apparatus 2, and then transmits the imaging instruction signal ICI which instructs the imaging, to the mobile camera apparatus 2.

The network communication section 31 receives an imaging request signal ICR from the terminal apparatus 4, and transmits the image data IMG to the terminal apparatus 4 in response to the imaging request signal ICR.

Also, the network communication section 31 receives a search request signal RVR from the terminal apparatus 4.

The camera position information managing section 32 manages the positions of respective mobile camera apparatuses.

In the present embodiment, the camera position information managing section 32 manages the position of each mobile camera apparatus based on the GPS data (GPS) that the mobile camera apparatus 2 transmits periodically. In other words, the camera position information managing section 32 stores the Ids, the positions and the time to correlate mutually, and updates these information sequentially.

The image acquisition control section 33 performs a control to acquire the image data IMG from the mobile camera apparatus 2. Specifically, the image acquisition control section 33 generates the imaging instruction signal ICI in response to the imaging request signal ICR transmitted from the terminal apparatus 4. Then, the image acquisition control section 33 stores (updates) the image data IMG received from the mobile camera apparatus 2 in the image database 35.

The image supply control section 34 performs a control to supply the image data IMG to the terminal apparatus 4. Specifically, the image supply control section 34 searches the image data which satisfy the request, from the image database 35, based on the imaging request signal ICR that is received from the terminal apparatus 4 and in which area/location, etc. are designated. Then, the image supply control section 34 supplies the specified image data IMG to the terminal apparatus 4. Also, when the image data do not satisfy the request, the image supply control section 34 informs the terminal apparatus 4 about that.

The image database 35 (appropriately referred as an "image DB" hereinafter) stores the image data IMG in the format as shown in FIG. 3. Since the control server 3 is capable of communicating with the plurality of mobile camera apparatuses, the image data IMG acquired by the plurality of mobile camera apparatuses are accumulated in the image database 35.

The terminal apparatus 4 is a terminal apparatus such as a personal computer, a cellular phone or a PDA, for example, which is operated by a user.

As shown in FIG. 2, the terminal apparatus 4 includes a network communication section 41 that performs communication with the control server 3 via the network 900, a control section 42 that is configured mainly with a microcomputer and performs an overall control of the terminal apparatus 4, and a display 43 including a liquid crystal display device, for example.

The control section 42 transmits the imaging request signal ICR in which the area/location, etc., are designated, to the control server 3 via the network communication section 41, and then receives the image data IMG from the control server 3 in response to this request signal. Also, the terminal apparatus 4 transmits the search request signal RVR, which requests the image by designating location/time, etc., to the control server 3.

The control section 42 displays the image contained in the acquired image data IMG on the display 43.

With the above, the principal configuration of the mobile camera system 1 is explained.

Next, a basic process executed in the mobile camera system 1 will be explained with reference to FIG. 4 and FIG. 5 hereunder. Here, a dot line indicates a flow of data in the flowcharts shown in figures from FIG. 4.

Figure 4:
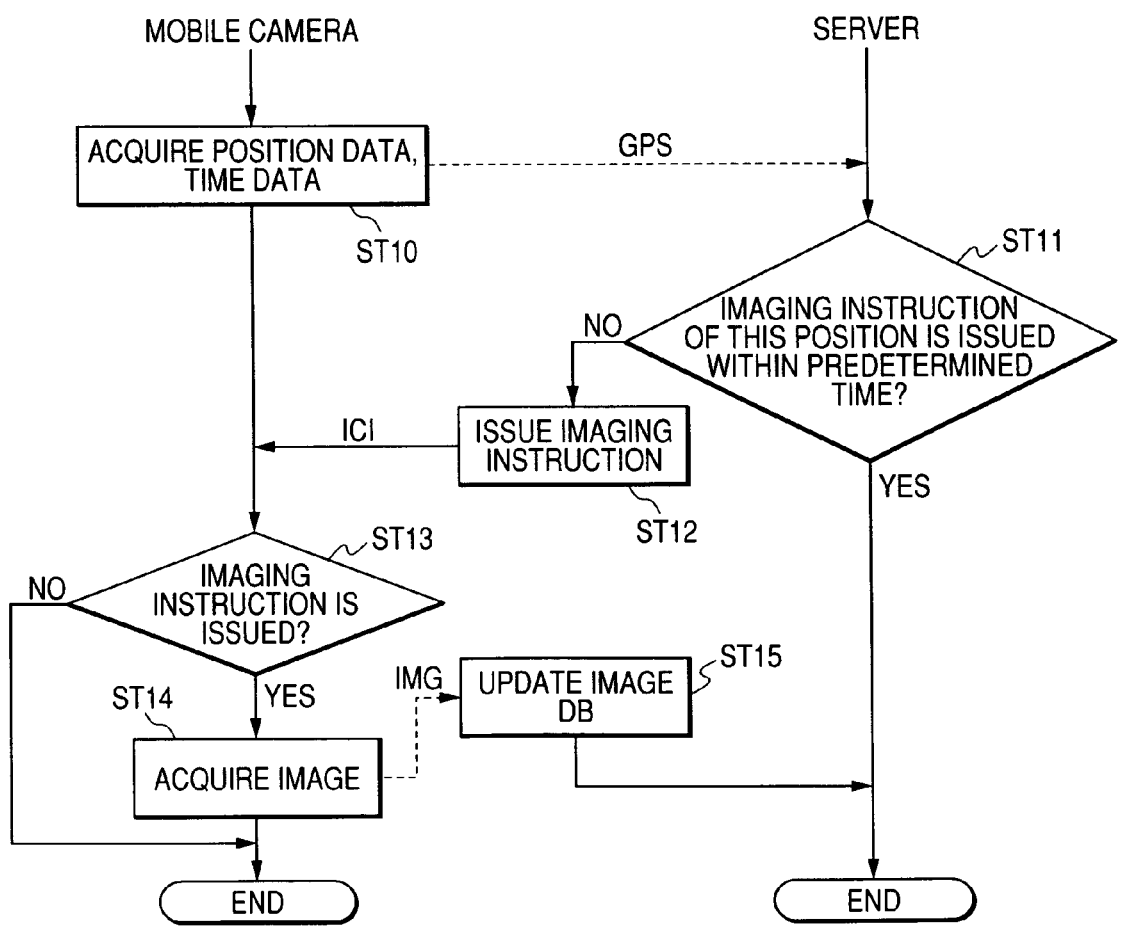
FIG. 4 is a flowchart showing an operation of a mobile camera system.

FIG. 4 is a flowchart showing an operation of the mobile camera system 1 when the imaging request is not issued.

When the imaging request is not issued, processes shown in the flowchart in FIG. 4 are carried out between the mobile camera apparatus 2 and the control server 3.

The mobile camera apparatus 2 acquires periodically the position information by using the GPS function, and then transmits the GPS data (GPS) including the position information and the time information to the control server 3 (step ST10). The GPS data (GPS) are managed by the camera position information managing section 32.

Also, the control server 3 manages the images for every location (area), in the image database 35. Then, it is checked whether or not the imaging instruction in which the position corresponding to the received GPS data (GPS) is designated is issued within a predetermined time (step ST11). If the imaging instruction is issued within the predetermined time, there is no need to issue the imaging instruction once again because the image DB is updated within the predetermined time.

In step ST11, if the imaging instruction is not issued within the predetermined time, the imaging instruction is issued by sending out the imaging instruction signal ICI to the mobile camera apparatus 2 (step ST12).

The mobile camera apparatus 2 that receives the imaging instruction (step ST13) operates the imaging section 21 to acquire the image (step ST14). Then, the mobile camera apparatus 2 transmits the image data IMG including this acquired image to the control server 3. As described above, the image data IMG includes the ID, the position information and the time information of the mobile camera apparatus 2. The mobile camera apparatus 2 operates the GPS function once again at the time of imaging so as to acquire the position information included in the image data IMG.

The control server 3 updates the image DB based on the received image data IMG (step ST15). In this manner, the control server 3 always manages/updates the image for every location (area), in the image DB, even when the imaging request is not issued from the terminal apparatus 4.

Figure 5:
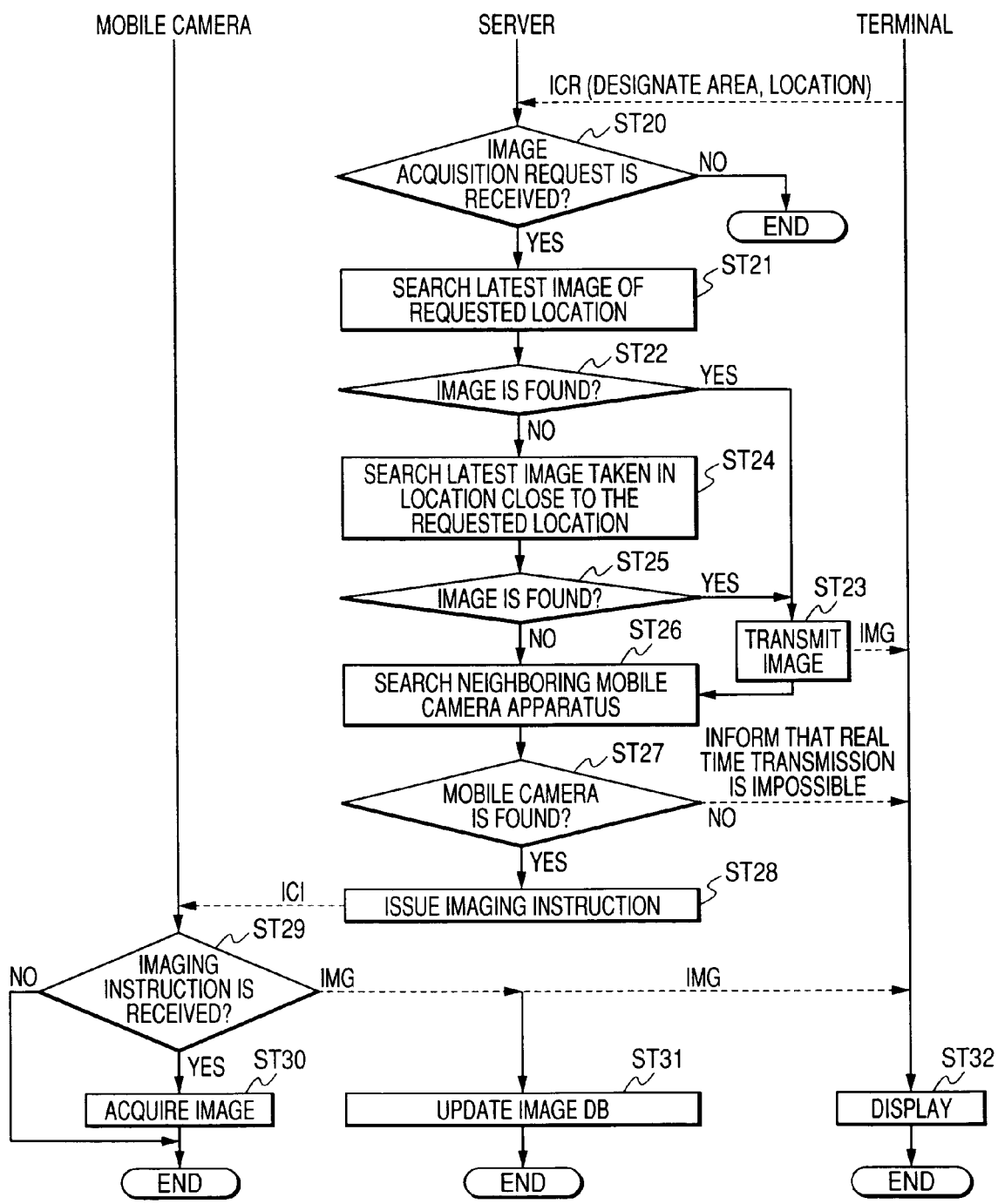
FIG. 5 is a flowchart showing an operation of a mobile camera system.

FIG. 5 is a flowchart showing an operation of the mobile camera system 1 when the control server 3 receives the imaging request from the terminal apparatus 4.

The imaging request is issued when the terminal apparatus 4 sends out the imaging request signal ICR in which the location (area) designated, to the control server 3. In other words, the imaging instruction signal ICI is sent out when the user operates the terminal apparatus 4 and designates the desired location (area) Then, when the control server 3 receives the imaging request signal ICR (step ST20), the control server 3 searches the latest image that corresponds to the designated location (area) from the image DB (step ST21). In this case, it is previously set that the image that is taken up to how many minutes before the present time is identified as the latest image.

If the latest image is found in the image DB (step ST22), the control server 3 transmits the image data IMG including that image to the terminal apparatus 4 (step ST23).

If the image in the image DB is the image corresponding to the designated location but not the latest image, or if the image in the image DB is the latest image but is the image corresponding to a different location from the designated location (step ST22), the control server 3 searches whether the latest image which is taken in a location close to the designated location (area) is found in the image DB (step ST24). If such a image can be specified (step ST25), the control server 3 transmits the image data IMG including the image to the terminal apparatus 4 (step ST23). The image data IMG is transmitted to the terminal apparatus 4, and the image is displayed on the display 43 of the terminal apparatus 4 (step ST32). Accordingly, the user operating the terminal apparatus 4 can view the latest image of the desired location (area).

In this case, a range that defines the location close to the designated location (area) is set previously in the control server 3.

Figure 6:
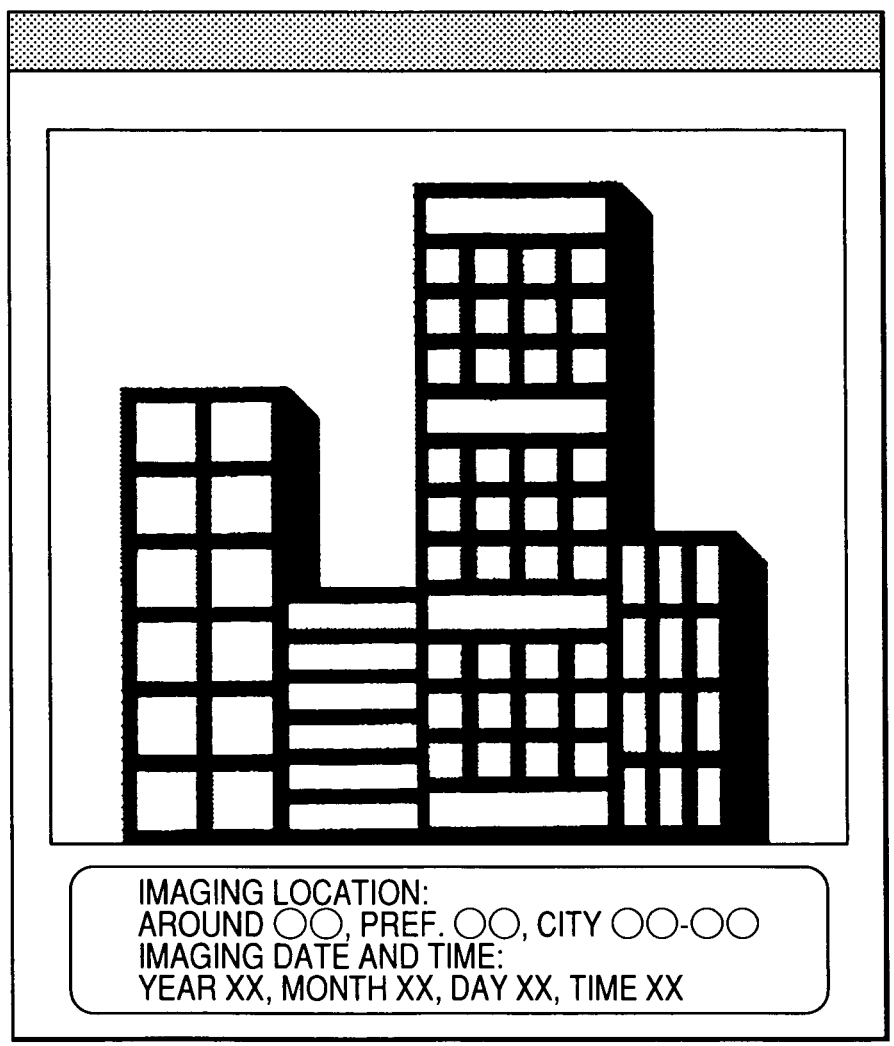
FIG. 6 is a view showing a display mode of a display of a terminal apparatus.

FIG. 6 is a view showing an example of a display mode of the display 43 of the terminal apparatus 4.

The image data IMG that the terminal apparatus 4 receives includes not only the image but also the position information and the time information. Therefore, as shown in FIG. 6, for example, "imaging location" and "imaging date and time" as well as the image are displayed at a bottom section of the image.

In steps ST24 to ST25, if the image cannot be specified, the image needs to be newly acquired from the mobile camera apparatus 2. Therefore, following processes are executed.

The control server 3 obtains the GPS data (GPS) periodically from the mobile camera apparatus 2, and manages the positions of respective mobile camera apparatuses by the camera position information managing section 32. Therefore, at first, the control server 3 searches for the mobile camera apparatus 2 which is in a location close to the designated location (area), based on the position information (step ST26). If the mobile camera apparatus 2 that is in a location close to the designated location (area) cannot be specified by the search (step ST27), the control server 3 informs the terminal apparatus 4 that it is impossible to transmit the requested image in real time.

If the mobile camera apparatus 2 that is in a location close to the designated location (area) can be specified (step ST27), the control server 3 issues the imaging instruction by sending out the imaging instruction signal ICI to the specified mobile camera apparatus 2 (step ST28).

The mobile camera apparatus 2 that receives the imaging instruction (step ST29) acquires the image by operating the imaging section 21 (step ST30). Then, the mobile camera apparatus 2 transmits the image data IMG including this acquired image to the control server 3. As described above, this image data IMG includes the ID, the position information and the time information of the mobile camera apparatus 2. The mobile camera apparatus 2 acquires the position information included in the image data IMG by operating the GPS function once again at the time of imaging.

The control server 3 updates the image DB by the received image data IMG (step ST31). Then, this image data IMG is transmitted to the terminal apparatus 4, and the image is displayed on the display 43 of the terminal apparatus 4 (step ST32). Accordingly, the user operating the terminal apparatus 4 can view the latest image of the desired location (area).

With the above, the basic processes executed in the mobile camera system 1 are explained with reference to FIG. 4 and FIG. 5.

In this case, the user can operate the terminal apparatus 4 to search whether or not the desired image is present in the image DB in the control server 3.

Figure 7:
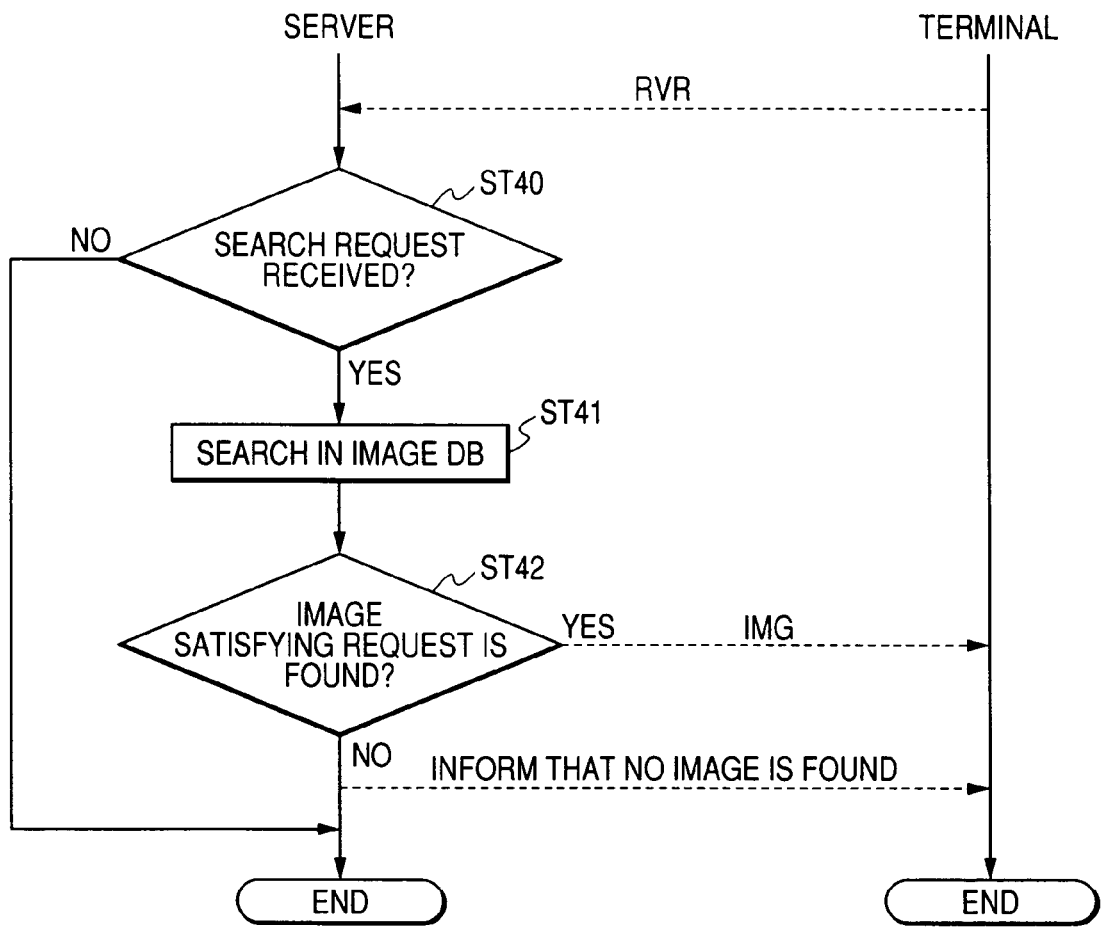
FIG. 7 is a flowchart showing an operation of a mobile camera system.

FIG. 7 is a flowchart showing an operation of the mobile camera system 1 when issuing the search request.

The terminal apparatus 4 issues the search request by sending out the search request signal RVR in which the location (area) is designated, to the control server 3. That is, when the user operates the terminal apparatus 4 and designates the desired location (area) the search request signal RVR is sent out.

Then, when the control server 3 receives the search request signal RVR (step ST40), the control server 3 searches the latest image that corresponds to the designated location (area) from the image DB (step ST41) In this case, it is previously set that the image that is taken up to how many minutes before the present time is identified as the latest image.

If the latest image is found in the image DB (step ST42), the image is transmitted to the terminal apparatus 4 as the image data IMG. If the latest image is not found in the image DB (step ST42), the control server 3 informs the terminal apparatus 4 that the requested image is not found in the image DB.

By this search function, the user can know whether or not the desired image is present in the image DB, in relatively a short time. If the desired image is not present in the image DB, the user needs to send out the imaging instruction signal ICI to the control server 3 so as to acquire the desired image.

As explained above, according to the mobile camera system 1 of the present embodiment, the control server 3 acquires the positions of the plurality of mobile camera apparatuses 2 respectively installed in the mobile body such as the vehicle and the images acquired by the mobile camera apparatuses 2 via radio communication, and manages them on the image DB of the control server 3. Then, in response to the imaging request in which the location (area) is designated and which is issued from the terminal apparatus 4, the control server 3 searches for the image satisfying the request in the image DB, or newly acquires the image satisfying the request from the mobile camera apparatus 2. Then, the control server 3 transmits the image to the terminal apparatus 4 via radio communication.

As a result, the user can sequentially check the latest image taken in the remote location (area) through the terminal apparatus 4.

Also, since a plurality of cameras is not installed in fixed locations, locations (areas) as the object of imaging are not limited to such fixed locations, and thus the user can view the images of the desired locations in a wide range. In addition, since one mobile camera apparatus can take images of a plurality of locations, an overall cost of the system can be reduced compared to the case of installing the plurality of cameras in the fixed locations.

<Second Embodiment>

A mobile camera system according to a second embodiment of the present invention will be explained hereunder.

A configuration of the mobile camera system of the present embodiment is substantially identical to the mobile camera system 1 according to the first embodiment, but processes of the mobile camera system of the present embodiment are different from those in the first embodiment.

In the mobile camera system of the present embodiment, the control server 3 accepts the imaging request from the user in advance. Then, a time when the mobile camera apparatus 2 reaches the user's desired location (area) is calculated, and then the imaging instruction is issued at the calculated time. Therefore, a so-called reserved imaging is possible.

In the mobile camera system of the present embodiment, the mobile camera apparatus 2 has vehicle information VCL including a scheduled running route and a speed of the vehicle in which the mobile camera apparatus is installed.

The information about the scheduled running route can be obtained, when the vehicle is equipped with a navigation system, from the navigation system. For example, when the vehicle is public transportation such as a share-ride bus, since the running route of the vehicle is determined previously, the information may be input beforehand into the mobile camera apparatus 2. Also, the speed information is information that the vehicle naturally possesses. For example, such information may be acquired from the navigation system or an engine control unit.

The control server 3 has a vehicle database (vehicle DB) in which the vehicle information VCL received from the mobile camera apparatus 2 are accumulated.

Figure 8:
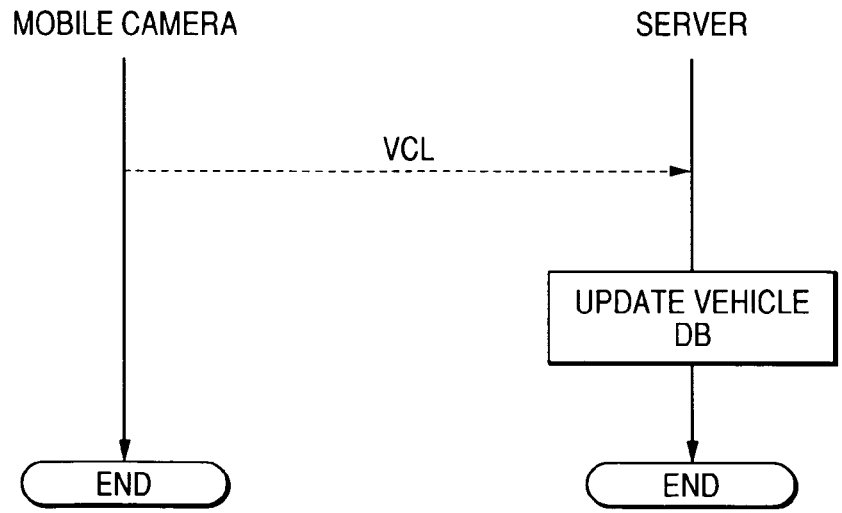
FIG. 8 is a flowchart showing a processing operation of vehicle information VCL.

FIG. 8 is a flowchart showing a processing operation of the vehicle information VCL.

As shown in FIG. 8, the vehicle information VCL acquired by the mobile camera apparatus 2 and including the scheduled running route and the speed are transmitted periodically to the control server 3. The control server 3 stores the vehicle information VCL in the vehicle DB while correlating the information with the ID of the mobile camera apparatus 2 that is a source of the transmission.

Next, an operation of the mobile camera system according to the present embodiment will be explained hereunder.

Figure 9:
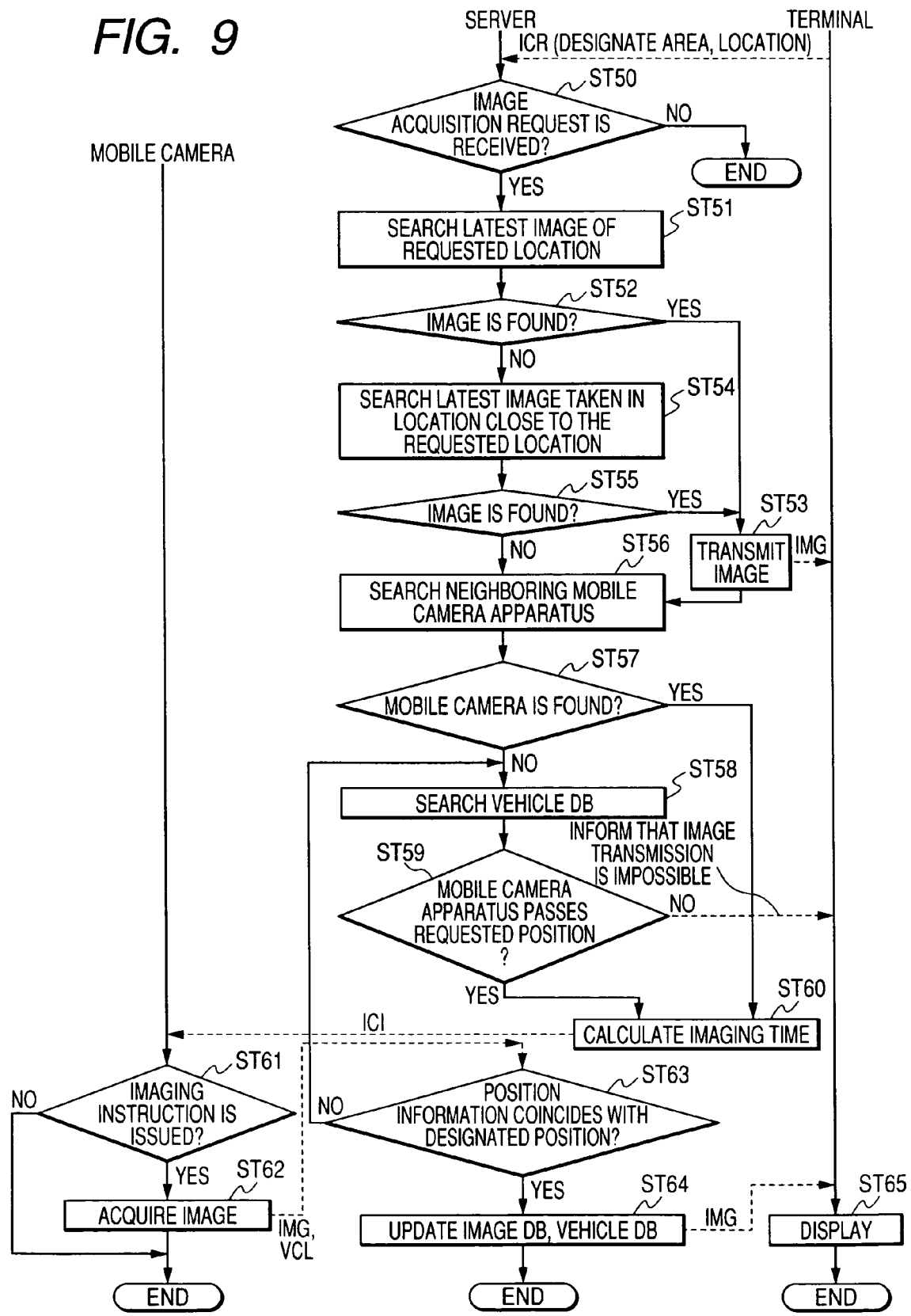
FIG. 9 is a flowchart showing an operation of a mobile camera system.

FIG. 9 is a flowchart showing an operation of the mobile camera system 1 when the imaging request is issued from the terminal apparatus 4 in the mobile camera system according to the present embodiment.

The imaging request is issued when the terminal apparatus 4 sends out the imaging request signal ICR in which the location (area) is designated, to the control server 3. That is, the imaging instruction signal ICI is sent out when the user operates the terminal apparatus 4 and designates the desired location (area).

Then, when the control server 3 receives the imaging request signal ICR (step ST50), the control server 3 searches the latest image that corresponds to the designated location (area) from the image DB (step ST51). In this case, it is previously set that the image that is taken up to how many minutes before the present time is identified as the latest image.

If the latest image is found in the image DB (step ST52), the control server 3 transmits the image data IMG including that image to the terminal apparatus 4 (step ST53).

If the image in the image DB is the image corresponding to the designated location but not the latest image, or if the image in the image DB is the latest image but is the image corresponding to a different location from the designated location (step ST52), the control server 3 searches whether the latest image which is taken in a location close to the designated location (area) is found in the image DB (step ST54). If such an image can be specified (step ST55), the control server 3 transmits the image data IMG including the image to the terminal apparatus 4 (step ST53). The image data IMG is transmitted to the terminal apparatus 4, and the image is displayed on the display 43 of the terminal apparatus 4 (step ST65). Accordingly, the user operating the terminal apparatus 4 can view the latest image of the desired location (area).

In steps ST54 to ST55, if the image cannot be specified, the image needs be newly acquired from the mobile camera apparatus 2. Therefore, following processes are executed.

The control server 3 periodically obtains the GPS data (GPS) from the mobile camera apparatus 2, and manages the positions of respective mobile camera apparatuses by the camera position information managing section 32. Therefore, at first, the control server 3 searches for the mobile camera apparatus 2 that is located close to the designated location (area), based on this position information (step ST56).

If the mobile camera apparatus 2 that is located close to the designated location (area) can be specified by this search (step ST57), the control server 3 transmits the imaging instruction signal ICI immediately to the mobile camera apparatus 2 while setting an imaging time in step ST60 as the present time.

In steps ST56 to ST57, if the mobile camera apparatus 2 that is located close to the designated location (area) cannot be specified (step ST57), the vehicle DB is searched (step ST58). Then, the control server 3 determines whether or not the mobile camera apparatus exists that is scheduled to pass the designated location (area) by the user, based on the vehicle information VCL of respective mobile camera apparatuses (step ST59). If the mobile camera apparatus that is scheduled to pass the location does not exist, the control server 3 informs the terminal apparatus 4 that it is impossible to transmit the image since the control server 3 cannot obtain the image.

If the mobile camera apparatus 2 that is scheduled to pass the location can be specified, the control server 3 calculates the imaging time, and then transmits the imaging instruction signal ICI to the specified mobile camera apparatus 2 at the calculated time (step ST60).

Such calculation of the imaging time is carried out based on the vehicle information VCL that are accumulated sequentially in the vehicle DB. The vehicle information VCL includes the scheduled running route and the speed of the vehicles in which the mobile camera apparatuses 2 are installed. Therefore, an estimated time at which the mobile camera apparatus 2 passes the user's designated location (area) is calculated based on the scheduled running route and the speed. Then, the control server 3 issues the imaging instruction by transmitting the imaging instruction signal ICI to the specified mobile camera apparatus 2 at a point of the estimated time.

In this case, in steps ST59 and ST60, even when the mobile camera apparatus exists that is scheduled to pass the user's designated location (area), it becomes a drawback to the convenience of the system if such mobile camera apparatus needs much time to reach the location (area). Therefore, the control server 3 limitedly searches for and specifies the mobile camera apparatus that can reach the location (area) within a predetermined period (first period).

The mobile camera apparatus that received the imaging instruction (step ST61) acquires the image by operating the imaging section 21 (step ST62). Then, the mobile camera apparatus 2 transmits the image data IMG including the acquired image to the control server 3. At that time, the mobile camera apparatus 2 acquires the vehicle information VCL at the time of imaging, and also transmits the vehicle information VCL to the control server 3.

The control server 3 checks whether or not the position information included in the image data IMG coincides with the user's requested location (area) (step ST63). Then, if the position information coincides with the requested location, the control server 3 updates the image DB and the vehicle DB (step ST64). In addition, the image data IMG is transmitted to the terminal apparatus 4, and the image is displayed on the display 43 of the terminal apparatus 4 (step ST65). Accordingly, the user operating the terminal apparatus 4 can view the latest image of the desired location (area).

In step ST63, if the position information included in the received image data IMG does not coincide with the user's requested location (area), the process goes back to step ST58 once again. Then, the vehicle DB is searched.

As explained above, according to the mobile camera system of the present embodiment, the control server 3 sequentially accumulates the vehicle information VCL which are acquired from the mobile camera apparatus 2 and include the speed and the scheduled running route, in the vehicle DB. Then, even when the mobile camera apparatus 2 does not exist near the user's desired location (area), the control server 3 specifies the mobile camera apparatus 2 that is scheduled to pass the location (area). Then, the control server 3 calculates the imaging time based on the vehicle DB, and issues the imaging instruction to the specified mobile camera apparatus 2.

Therefore, even when the user cannot obtain the desired image in real time, the user can obtain the desired image later. As a result, the user does not lose a chance to catch the desired image.

In this case, various modifications described in the following may be applied irrespective of the contents of the above embodiments.

For example, the user can make the imaging reservation by previously designating the location (area) and the time.

In other words, the terminal apparatus 4 sends out the imaging instruction signal ICI to the control server 3 by designating the location (area) and the time. Then, the control server 3 is configured to hold the imaging instruction signal ICI, make the camera position information managing section 32 search for/specify either the mobile camera apparatus 2 located in the designated location (area) or the mobile camera apparatus 2 located near the designated location (area) at a moment when it gets to the designated time, and transmit the imaging request signal ICR to the specified mobile camera apparatus 2.

Also, sometimes the user expects to acquire the image at the desired location (area) continuously for a certain period.

In such case, in response to the user's request to continuous imaging, as far as the specified mobile camera apparatus 2 is located in the designated location (area), the imaging instruction signal ICI may be sent out to the mobile camera apparatus 2 continuously, which is specified by searching the image DB. For example, either steps ST21 to ST28 in the flowchart of FIG. 5 in the first embodiment or steps ST51 to ST60 in the flowchart of FIG. 9 in the second embodiment are repeatedly executed.

At that time, there is no need to perform the imaging continuously by the single specified mobile camera apparatus 2 alone. The image may be acquired by the plurality of mobile camera apparatuses that are present in the user's designated location (area) or pass the location. In such case, the control server 3 transmits the imaging instruction signal ICI to all the mobile camera apparatuses 2 that satisfy the search conditions.

In case the images of the identical designated location (area) are acquired continuously by the plurality of mobile camera apparatuses 2, the installation conditions of respective mobile camera apparatuses on the vehicles need to be taken into account. For instance, since a height of the camera location is different depending on that the mobile camera apparatus is set up on the roof of a bus or that the mobile camera apparatus is set up on the roof of the passenger car, the acquired images becomes different. Also, even when the mobile camera apparatuses are respectively set up on the roof of the passenger cars of the same type, the acquired image are different according to an elevation angle setting or a zoom setting.

Therefore, it is preferable to configure the mobile camera system such that in the control server 3, the camera installation conditions (setting height, elevation angle, zoom, etc.) of respective mobile camera apparatuses are stored previously, and then the mobile camera apparatus 2 that issues the imaging instruction is specified further by selecting only the mobile camera apparatuses having the same camera installation conditions. Accordingly, the images provided to the terminal apparatus 4 become images in which changes of field angle are small and smooth.

FIGS. 10A to 10C are schematic views showing an image selecting process from the above viewpoint. FIG. 10A shows traffic condition of the vehicles having the mobile camera apparatus respectively, FIG. 10B shows the images acquired by the mobile camera apparatus set up on respective vehicles, and FIG. 10C shows the selected results of the images.

In FIGS. 10A to 10C, since a setting height of the mobile camera apparatus set on the bus as the forth vehicle is high, the image acquired by the bus is different from the images acquired by the mobile camera apparatuses set up on other passenger cars. In such case, when the plurality of images are provided continuously, the user can obtain the images that are viewed smoothly as a whole, by removing the image acquired by the bus as the forth vehicle in the image supply control section 34, for example.

Also, it is preferable that the control server 3 adjusts/corrects focus and exposure so that the impressions of the images become uniform. When the adjustment/correction is not performed, the images displayed on the terminal apparatus 4 vary in brightness and generate flashing. Thus, it becomes hard for the user to view the images.

Therefore, it is preferable to configure the mobile camera system such that the control server 3 manages the characteristic values, such as a lens focal length, an F value, a resolution of an image sensor, of the mobile camera apparatus 2, then performs the correcting process to individual images so that differences in the exposure and the focal distance of the images that are acquired from the plurality of mobile camera apparatuses are reduced, and then transmits the image data to the terminal apparatus 4.

Figures 11A, 11B, 11C:
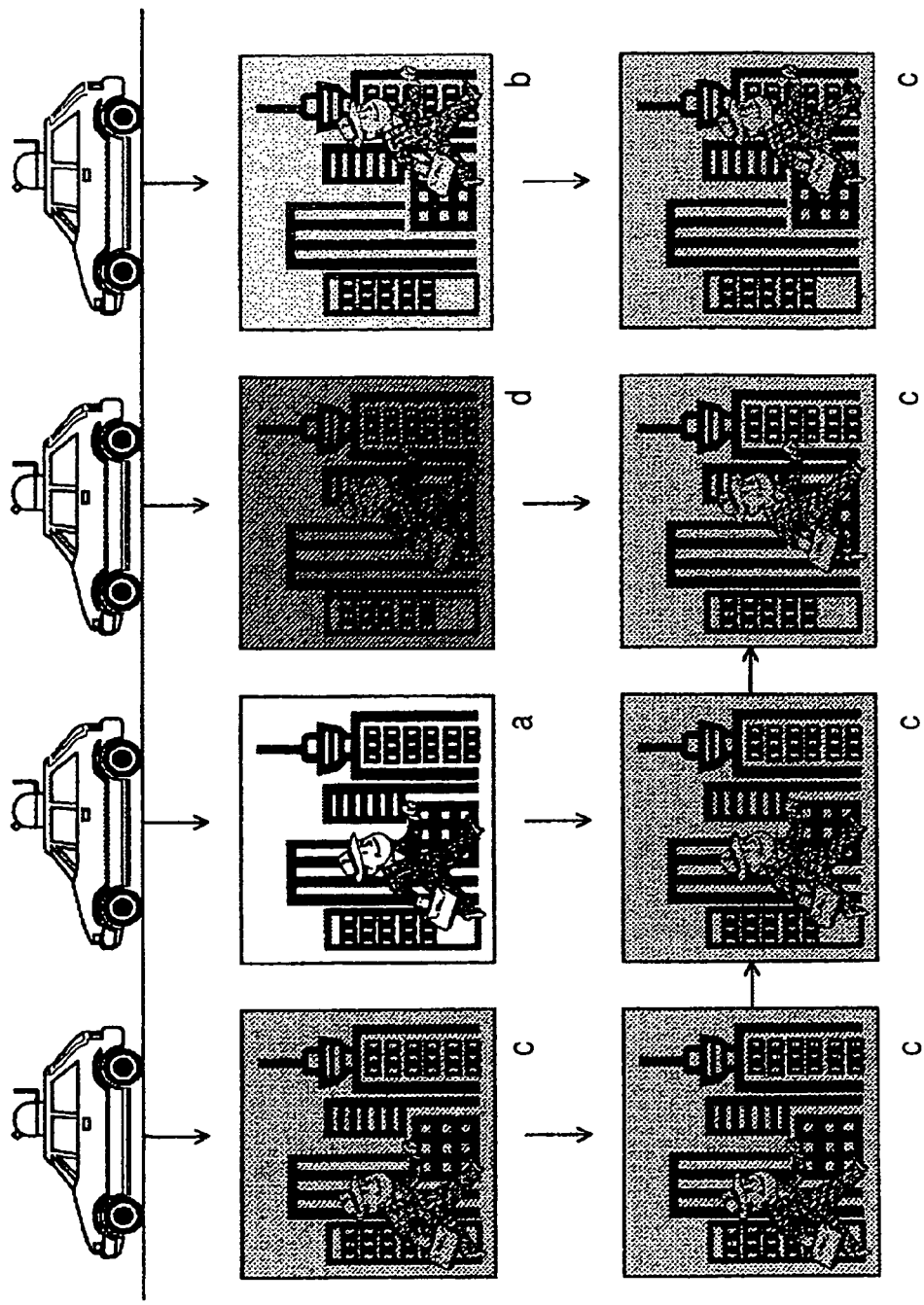
FIG. 11A to 11C are schematic views showing an image adjusting/correcting process.

FIGS. 11A to 11C are schematic views showing an image adjusting/correcting process from the above viewpoint. FIG. 11A shows the traffic condition of the vehicles having the mobile camera apparatus respectively, FIG. 11B shows the images acquired by the mobile camera apparatus set up on respective vehicles, and FIG. 11C shows the results of the adjusting/correcting process of the images.

In FIGS. 11A to 11C, since values of the exposure of the mobile camera apparatuses set up on respective passenger cars are different, the acquired images have a different brightness respectively. In such case, respective images are adjusted/corrected in the image supply control section 34 so that the exposures of the acquired images become uniform. Accordingly, the user can obtain the images that are viewed smoothly.

Also, when it is intended to acquire a wide-angle image that is difficult to image only with the single mobile camera apparatus, the image may be provided to the terminal apparatus by synthesizing the images taken by two or more than two mobile camera apparatuses.

In this case, the images having the same field angle size cannot always be acquired in all the mobile camera apparatuses. Also, sometimes the image has distortion at its edges depending on lens performance. Therefore, the mobile camera system is configured such that a sheet of a synthesized image is generated by performing on the taken images a geometrical transformation to cut out a portion and correct the distortion, or a similar transformation (enlarging/reducing process) to adjust size, thereby the taken images meet the field angle size of the image to be provided to the terminal apparatus.

Figure 12A:
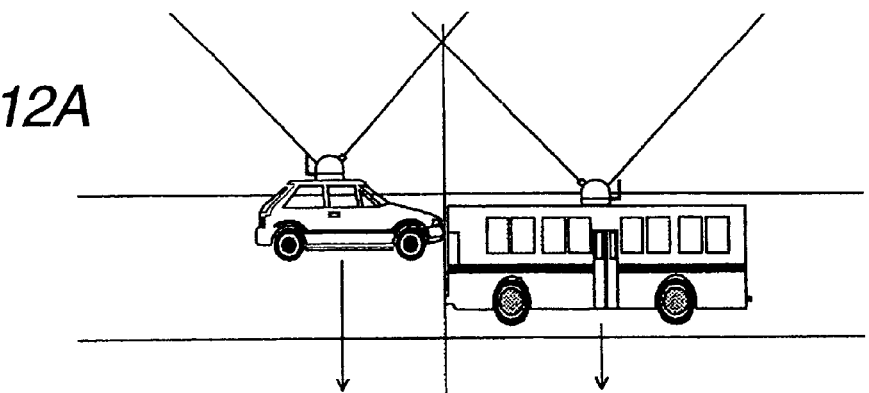
FIG. 12A to 12C are schematic views showing an image synthesizing process.
Figure 12B:
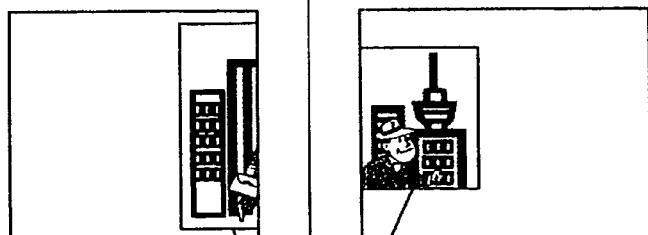
Figure 12C:

FIGS. 12A to 12C are schematic views showing an image synthesizing process from the above viewpoint. FIG. 12A shows the traffic condition of the vehicles having the mobile camera apparatus respectively, FIG. 12B shows the images acquired by the mobile camera apparatus set up on respective vehicles, and FIG. 12C shows the result of the synthesizing process of the image.

In FIGS. 12A to 12C, a sheet of wide-angle image as shown in FIG. 12C is generated by synthesizing respective images, as shown in FIG. 12B, acquired from the mobile camera apparatuses set up on the passenger car and the bus as shown in FIG. 12A. This process is executed in the image supply control section 34, for example. Accordingly, the desired image can be provided to the terminal apparatus, and as a result the user can obtain the images that are viewed smoothly.

According to the present invention, a user can view images of various desired locations while staying in a location remote from those locations.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:
1. A mobile camera system, comprising:
  at least one mobile camera which is assigned with identification information;
  a terminal apparatus; and
  a server,
  wherein the mobile camera includes:
    a first communication section for communicating with the server;
    an imaging section for imaging a subject; and
    a transmitting section which transmits image data of an image that is imaged in the imaging section and the identification information to the server,
  wherein the terminal apparatus includes:
    a second communication section for communicating with the server; and
    a requesting section which transmits an imaging request signal to the server, said imaging request signal designating a location and requesting imaging of the designated location,
  wherein the server includes:
    a third communication section for communicating with the mobile camera and the terminal apparatus, said third communication section receiving the image data from the mobile camera;
    a location search section which has location information of the mobile camera and the identification information that are correlated with each other, and searches for and specifies the mobile camera that is in the location designated by the imaging request signal based on the location information; and
    an imaging instructing section which transmits an imaging instruction signal to the specified mobile camera, said imaging instruction signal instructing the mobile camera to perform imaging, and wherein, in response to the imaging request signal that is issued from the terminal apparatus to designate location, the server searches for image data satisfying the imaging request signal in a continuously updated image database, and if the image data satisfying the imaging request signal is not found in the searching, the server newly acquires the image data satisfying the imaging request signal from the mobile camera.

2. The mobile camera system according to claim 1, wherein said at least one mobile camera includes a plurality of said mobile cameras, the terminal apparatus further includes a selecting section which selects the mobile camera to which the imaging instructing section of the server transmits the imaging instruction signal, from the mobile cameras specified by the location search section, and the imaging instructing section transmits the imaging instruction signal to the mobile camera selected by the selecting section.

3. The mobile camera system according to claim 1, wherein the transmitting section of the mobile camera transmits information about a scheduled running route and a speed of the mobile camera to the server, and the location search section of the server searches for and specifies the mobile camera that is scheduled to move to the location designated by the imaging request signal within a predetermined period, based on the received information about the scheduled running route and the speed.

4. The mobile camera system according to claim 1, wherein the imaging request signal further designates a time, and the location search section of the server searches for and specifies the mobile camera that is in the designated location at the designated time, based on the location information of the mobile camera.

5. The mobile camera system according to claim 1, wherein the server further includes a storage which stores the image data received from the mobile camera, and the second communication section of the terminal apparatus acquires the image data stored in the storage.

6. The mobile camera system according to claim 1, wherein the imaging instructing section of the server continuously transmits the imaging instruction signal to the mobile camera that is specified by the location search section, while the specified mobile camera is in the location designated by the imaging request signal.

7. The mobile camera system according to claim 1, wherein the location search section of the server sequentially searches for and specifies the mobile camera that is in the location designated by the imaging request signal.

8. The mobile camera system according to claim 7, wherein said at least one mobile camera includes a plurality of said mobile cameras, the server further includes a selecting section which selects the mobile camera of which camera setting condition is the same as that stored in the server, from the mobile cameras specified by the location search section, the imaging instructing section transmits the imaging instruction signal to the selected mobile camera continuously, and the camera setting condition includes at least one of a setting height, an elevation angle and a zoom, of the mobile camera.

9. The mobile camera system according to claim 1, wherein, in response to an imaging request that is issued from a terminal apparatus to designate location, the server searches for the image satisfying the request in the continuously updated image database or newly acquires the image satisfying the request, from the mobile camera.

10. A mobile camera system, comprising:
at least one mobile camera;
a terminal apparatus; and
a server,
wherein the mobile camera includes:
a first communication section for communicating with the server;
an imaging section for imaging a subject; and
a first transmitting section which transmits image data of an image that is imaged in the imaging section to the server,
wherein the terminal apparatus includes:
a second communication section for communicating with the server; and
a requesting section which transmits a search request signal to the server, said search request signal designating information that includes at least one of an imaging location and an imaging time, and said search request signal requesting a search of the image data that is correlated with the designated information, and
wherein the server includes:
a third communication section for communicating with the mobile camera and the terminal apparatus, said third communication section receiving the image data from the mobile camera;
a storage for storing the received image data and information that includes at least one of an imaging location and an imaging time of the image data, said image data and said information being correlated with each other;
an image search section which searches for and specifies the image data that is correlated with the information designated by the search request signal, from the image data stored in the storage, in response to the search request signal received from the terminal apparatus; and
a second transmitting section which transmits the specified image data to the terminal apparatus, and wherein, in response to the search request signal that is issued from the terminal apparatus to designate location, the server searches for image data satisfying the search request signal in a continuously updated image database, and if the image data satisfying the search request signal is not found in the searching, the server newly acquires the image data satisfying the search request signal from the mobile camera.

11. The mobile camera system according to claim 10, wherein
the mobile camera acquires the information that includes at least one of the imaging location and the imaging time, and
said first transmitting section of the mobile camera transmits the acquired information and the image data to the server, that are correlated with each other.

12. The mobile camera system according to claim 10, wherein
the server further includes a selecting section which selects the image data of the image that is imaged by the mobile camera of which camera setting condition is the same as that stored in the server, from the image data specified by the image search section, the second transmitting section of the server transmits the selected image data to the terminal apparatus continuously, and the camera setting condition includes at least one of a setting height, an elevation angle and a zoom, of the mobile camera.

\* \* \* \* \*